(12) United States Patent
Ales et al.

(10) Patent No.: US 6,507,429 B1
(45) Date of Patent: Jan. 14, 2003

(54) ARTICLE COMPRISING A HIGH POWER/ BROAD SPECTRUM SUPERFLUORESCENT FIBER RADIATION SOURCE

(75) Inventors: Gaelle Ales, Summit, NJ (US); Rolando Patricio Espindola, Chatham, NJ (US); Thomas Andrew Strasser, Warren, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/383,700

(22) Filed: Aug. 26, 1999

(51) Int. Cl.$^7$ ................................................. H01S 3/00
(52) U.S. Cl. ........................................ 359/341.1; 372/6
(58) Field of Search ........................... 359/341.1; 372/6

(56) References Cited

U.S. PATENT DOCUMENTS

| | | | |
|---|---|---|---|
| 5,668,821 A | 9/1997 | Hodgson et al. ............... | 372/6 |
| 5,701,318 A | 12/1997 | Digonnet et al. .............. | 372/6 |
| 6,172,995 B1 * | 1/2001 | Yang ............................. | 372/6 |
| 6,233,092 B1 * | 5/2001 | Flood et al. ................. | 359/345 |

FOREIGN PATENT DOCUMENTS

KR        2001010557       * 2/2001

OTHER PUBLICATIONS

Wysocki et al, Spectral Characteristics of High–Power 1.5 um Broud–Band Superluminescent Fiber Sources (1990), IEEE Photonics Technology Letters, vol. 2, No. 3, pp. 178–180.*

Parry, S.P. et al., *Technical Digest*, "Optical Amplifiers and Their Applications", pp. 128–131, Jul. 27–29, 1998.

Lee et al., *Optics Letters*, "Passive erbium–doped fiber seed photon generator for high–power Er3+–doped fiber fluorescent sources with an 80–nm bandwidth", vol. 24, No. 5, pp. 279–281, Mar. 1, 1999.

Swanson et al., *Optics Letters*, "In vivo retinal imaging by optical coherence tomography", vol. 18, No. 21, pp. 1864–1866, Nov. 1, 1993.

Han et al., *Electronics Letters*, "2.5 Gbit/s transmission of spectrum–sliced fibre ampifier light source channels over 200km of dispersion–shifted fibre", vol. 31, No. 12, pp. 989–991, Jun. 8, 1995.

Bergh et al., *Optics Letters*, "All–single–mode fiber–optic gyroscope with long–term stability", vol. 6, No. 10, pp. 502–504, Oct. 1981.

* cited by examiner

*Primary Examiner*—Mark Hellner
(74) *Attorney, Agent, or Firm*—Eugene E. Pacher

(57) ABSTRACT

A novel superfluorescent fiber source (SFS) has high power and broad bandwidth, and can advantageously be used in a variety of applications, e.g., optical coherent tomography systems, sliced spectrum optical fiber communication systems, and optical position sensing systems. The novel SFS comprises a first and a second length of rare earth-doped optical fiber, with an optical isolator therebetween. Light from a first pump source is provided to the first length of optical fiber, and light from a second pump source is provided to the second length of optical fiber. An optional reflector is disposed to reflect at least some upstream-propagating light back into the first length of optical fiber, whereby generation of long-wavelength amplified spontaneous emission (ASE) is facilitated. The long-wavelength ASE is transmitted through the optical isolator to the second length of rare earth-doped optical fiber, where broadband ASE is generated and the long-wavelength ASE is amplified. The resulting ASE is provided to utilization means.

8 Claims, 2 Drawing Sheets

ARTICLE COMPRISING A HIGH POWER/ BROAD SPECTRUM SUPERFLUORESCENT FIBER RADIATION SOURCE

FIELD OF THE INVENTION

This invention pertains to broad spectrum optical fiber radiation sources, and to articles that comprise such sources.

BACKGROUND

Broadband optical fiber radiation sources are of interest because of their wide range of applications, from sliced spectrum sources to optical noise sources in EDFA (Er-doped fiber amplifier) measurement systems, from optical sensor systems to fiber optic gyroscopes and to low-coherence tomography. In particular, superfluorescent fiber sources (SFS) using amplified spontaneous emission (ASE) from an Er-doped fiber are of considerable interest.

U.S. Pat. No. 5,668,821 discloses use of a long period grating to spectrally flatten the output of a SFS, and U.S. Pat. No. 5,701,318 discloses a polarized SFS, with a polarizer disposed within the superfluorescent fiber. S. P. Parry et al., "Optical Amplifiers and Their Applications" Conference, TuD3, 1998 disclose a high power/broad band SFS that uses a single long length (51 m) of Er-doped fiber, and J. H. Lee et al., *Optics Letters*, Vol. 24(5), p. 279, Mar. 1, 1999 discloses a prior art high power/broad band SFS that uses two pumped lengths of Er-doped fiber, and a novel source that uses a single length of pumped Er-doped fiber and an unpumped length of Er-doped fiber before the amplifier stage.

The above recited references are exemplary only. All cited references are incorporated herein by reference.

Various SFS configurations have been reported in the prior art, but the double pass backward (DPB) configuration has been shown to provide the largest bandwidth and the highest conversion efficiency. However, even using a DPB configuration, it is difficult to devise a SFS that has high power (e.g., greater than 10 mW) and broad bandwidth (e.g., greater than 40 nm between ±3 dB points).

The main difficulty with achieving high power and broad bandwidth is the bandwidth narrowing that is experienced at high pump powers by SFSs. See, for example, S. P. Parry et al., op.cit. It is known that this bandwidth narrowing is a consequence of the wavelength-dependent gain coefficient of Er-doped fiber. In view of the great utility of high power/large bandwidth SFSs, it would be desirable to have available a broadband SFS (e.g., >40 nm between ±3 dB points) that can provide high power (e.g., >10 mW). This is because increased SFS bandwidth typically results in increased resolution in, e.g., an optical tomography system, and increased power (spectral density) typically results in increased signal to noise ratio. This application discloses such a broad band/high power SFS.

DEFINITIONS AND GLOSSARY OF TERMS

By "light" we mean herein electromagnetic radiation of wavelengths of interest for SFSs, generally in the infrared part of the spectrum.

The "rare earths" (REs) are the elements of atomic numbers 57–71, and the rare earths that are suitable for stimulated emission in a silica-based fiber will be referred to as "SE-REs". Preferred SE-REs are Er, Yb and Nd.

SUMMARY OF THE INVENTION

In a broad aspect, the invention is embodied in a SFS of novel design, and in articles (e.g., a communication system, a measurement system, an optical sensor system, a fiber optic gyroscope, a low-coherence tomography system) that comprise the SFS.

More specifically, the invention is embodied in an article that comprises an optical fiber light source. The light source comprises a first and a second length of SE-RE-doped optical fiber, disposed such that light can be transmitted axially from the first to the second length. The light source also comprises a source of first pump light, and also comprises a coupler for coupling first pump light into the first length of SE-RE-doped optical fiber into the downstream direction.

Significantly, the light source also comprises a source of second pump light, a coupler for coupling the second pump light into the second length of SE-RE-doped optical fiber into the upstream direction, and an optical isolator disposed between the first and second lengths of SE-RE-doped optical fiber such that upstream-propagating light from the second length of SE-RE-doped optical fiber is substantially prevented from reaching the first length of SE-RE-doped optical fiber. In a preferred embodiment, the light source furthermore comprises a reflector disposed to reflect at least some upstream-propagating light back into the first length of SE-RE-doped optical fiber in the downstream direction, whereby generation of long-wavelength ASE is facilitated. The long-wavelength ASE is transmitted through the optical isolator from the first to the second length of SE-RE-doped optical fiber, where broadband ASE is generated. The broadband ASE propagates from the second length of SE-RE-doped optical fiber in the downstream direction to utilization means.

The drawings are not intended to be to scale or in proportion.

DETAILED DESCRIPTION

Figure 1:
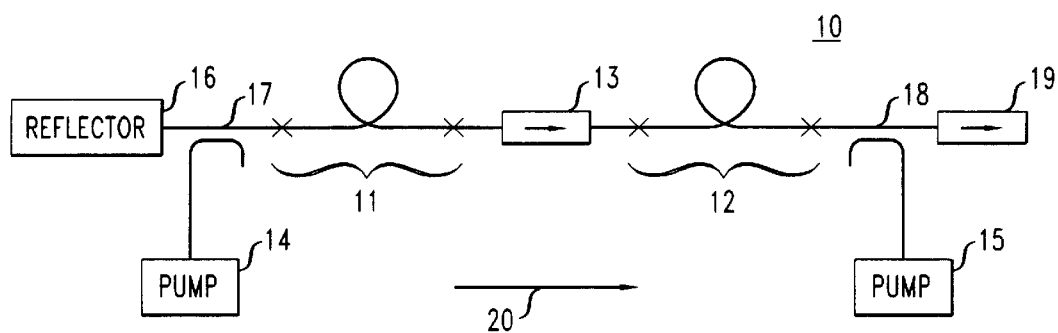
FIG. 1 schematically depicts an exemplary light source according to the invention.

FIG. 1 schematically shows an exemplary embodiment of a SFS 10 according to the invention, wherein numerals 11 and 12 refer to the first and second lengths of SE-RE-doped optical fiber, respectively, 13 refers to an optical isolator disposed between the first and second lengths, 14 and 15 refer to the sources of first and second pump light, respectively, and 16 refers to an optional broadband reflector. Numerals 17 and 18 refer to conventional couplers, 19 refers to an optical isolator, and arrow 20 indicated the downstream direction.

The exemplary FSF is designed to generate the required long-wavelength ASE in the first stage 11 and to amplify the generated ASE in the second stage 12. The second stage also serves to generate the short wavelength ASE in a manner similar to a conventional single-pass backward ASE source. The amount of long-wavelength ASE injected into the second stage from the first one, and the pump power of the second stage typically are balanced to obtain the desired broad bandwidth.

By way of example, the first and second lengths of optical fiber are respectively 50 and 10 m in length, with the fiber being silica-based and Er-doped to have peak absorption of 16 dB/m at 1530 nm. The first pump source exemplarily provides 100 mW of 980 nm pump light that is propagating in the downstream direction, and the second pump source exemplarily provides 120 mW of 1480 nm pump light that is propagating in the upstream direction. The optional broadband reflector exemplarily is a flat cleave at the input end of the first stage. The cleave provides 4% broadband reflection, which is sufficient to efficiently generate the downstream propagating long wavelength ASE. In an other embodiment the reflector is a 90% Au reflector, selected to provide increased pump efficiency. In principle the reflectivity can be any value >0 and ≦100%, commensurate with light source characteristics.

Figure 2:
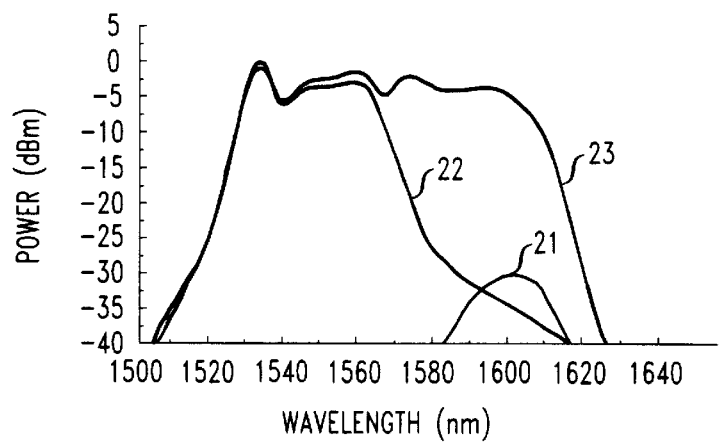
FIG. 2 shows the output spectrum of an exemplary light source according to the invention.

FIG. 2 shows the output spectrum of the above-described exemplary SFS. The total output power was measured to be greater than 25 mW. The plot of FIG. 2 shows three curves, with curve 23 being the output spectrum of the SFS when both pump diodes are turned on. Curve 22 is the output spectrum of the second stage when only the 1480 nm pump diode is turned on. The output spectrum in this case is similar to the spectrum that would be obtained from a single pass backward ASE source. The bandwidth in this case is only about 30 nm. Curve 21 is the output spectrum of the first stage when only the 980 nm pump diode is turned on. As can be seen, the first stage generates substantially only long wavelength ASE. As can be seen from curve 23, the bandwidth of the exemplary SFS according to the invention is greater than 75 nm between the ±3 dB points. Routine optimization of an SFS according to the invention is expected to yield even greater power and/or bandwidth.

Exemplary results obtained with the exemplary non-optimize SFS according to the invention compare favorable with a commercially available prior art erbium SFS (fluorite fiber) which produces about 10 mW of power with a bandwidth of about 70 nm (measured at the −10 dB points; corresponding to about 35 nm between ±3 dB points).

It will be appreciated that the disclosed SFS according to the invention is exemplary only, and that variations of the basic design are possible and are contemplated. For instance, a single pump source could provide the power for both the first and second stages. For fibers doped with SE-REs other than Er the pump wavelength and other systems parameters (e.g., doping levels, fiber lengths) will typically be different from those of the above described exemplary system. A minor amount of routine experimentation will typically result in an acceptable system.

Although the emission spectrum of light sources according to the invention is typically relatively smooth (see FIG. 2), for some applications it may be desirable to further smooth the output of the light source. This can be accomplished by conventional filtering means, e.g., by means of one or more long period gratings.

SFS according to the invention are advantageously used in apparatus whose performance improves with increasing bandwidth and/or power of the light source. Among such apparatus are an optical coherent tomography system, a sliced spectrum optical communication system, and a position sensing system with optical fiber gyroscope.

Figure 3:
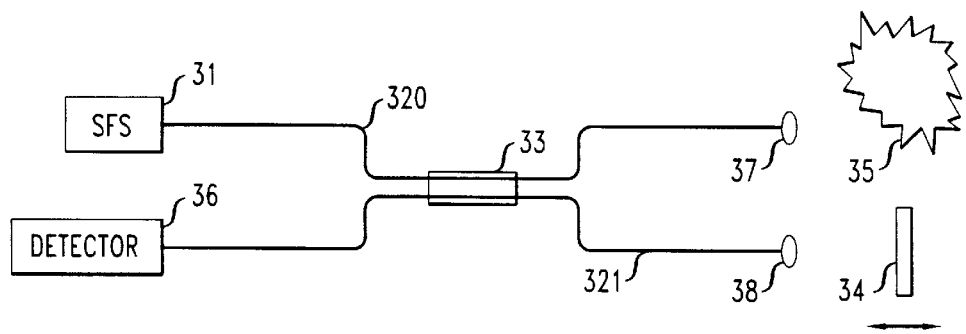
FIG. 3 schematically depicts an exemplary optical coherent tomography system according to the invention.

FIG. 3 schematically depicts an exemplary optical coherent tomography system 30. Reference numeral 31 refers to a SFS according to the invention, numerals 320 and 321 refer to optical fiber, numeral 33 is a conventional fiber coupler, 34 is a reference mirror, 35 is an object under examination, and 36 is a photodetector. The SFS light is transmitted through fiber 320 to coupler 33, where it is split into two arms. Conventional optics 37 focuses light from one arm onto the object under observation, and optics 38 focuses the light from the other arm onto reference mirror 34. Light reflected from the object under observation and the reference mirror is focused by conventional optics 37 and 38 onto the respective arms and guided to the coupler, where light from the two arms is caused to interfere. The interference signal is transmitted to the detector. By scanning the mirror position, the interference signal provides information about the object under observation, with the resolution of the system being proportional to the bandwidth of the SFS. For more detail, see E. A. Swanson et al., *Optics Letters,* Vol. 18(21), pp. 1864–1868 (1993).

Figure 4:
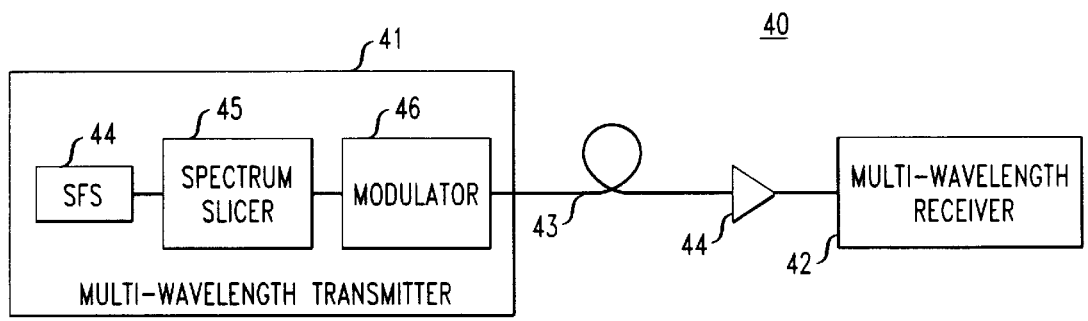
FIG. 4 schematically shows an exemplary sliced spectrum optical fiber communication system according to the invention.

FIG. 4 schematically depicts an exemplary sliced spectrum optical fiber communication system 40. Numerals 41–46 refer, respectively, to a multi-wavelength transmitter, multi-wavelength receiver, optical fiber, optical amplifier, SFS according to the invention, spectrum slicer, and modulator. During operation, the output of the SFS is spectrally sliced in known manner into a multiplicity a wavelength channels by means of the spectrum slicer 45. The number of channels and the spectral width of the channels can be selected by adjustment of the spectrum slicer. The channels are then encoded with data by means of modulator 46, and the modulated channels are coupled into the optical fiber and propagate towards the optional amplifier and the receiver. For more detail, see for instance, J. H. Han et al., *Electronics Letters,* Vol. 31(12), pp. 989–991, (1995).

Figure 5:
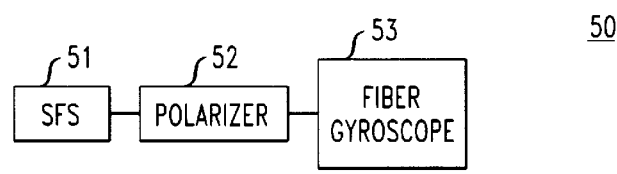
FIG. 5 schematically depicts an exemplary optical position-sensing system according to the invention.

FIG. 5 schematically depicts an exemplary position sensing system 50 that comprises a SFS 51 according to the invention, a polarizer 52, and a fiber gyroscope 53. Use of the SFS according to the invention will typically result in improved performance of the position sensing system since use of a broader bandwidth light source results in general in improved resolution. For more detail see for instance, R. A. Bergh et al., *Optics Letters,* Vol. 6, pp. 502–504 (1981).

It will be understood that use of a SFS according to the invention is not limited to the above-discussed applications, and that use is contemplated wherever benefit can be derived from use of a high power wide bandwidth SFS according to the invention.

We claim:

1. An article comprising an optical fiber light source comprising
   a) a first and a second length of optical fiber doped with one or more rare earth elements suitable for stimulated emission from the optical fiber, said rare earth elements to be referred to as SE-REs", said first and second lengths of optical fiber disposed such that light can be axially transmitted from the first to the second length;
   b) a source of first pump light; and
   c) a coupler for coupling said first pump light into said first length of SE-RE-doped optical fiber in a downstream direction; CHARACTERIZED IN THAT the optical fiber light source further comprises
   d) a source of second pump light;
   e) a coupler for coupling said second pump light into said second length of SE-RE-doped optical fiber in an upstream direction;
   f) an optical isolator disposed between said first and second lengths of SE-RE-doped optical fiber such that upstream-propagating light from said second length of SE-RE-doped optical fiber is substantially prevented from reaching said first length of SE-RE-doped optical fiber; and g) the optical fiber light source is adapted for generating long-wavelength amplified spontaneous emission light in said first length of SE-RE doped optical fiber, said long wavelength amplified spontaneous emission light being transmitted through said optical isolator to the second length of SE-RE doped optical fiber, with the resulting broadband spontaneous emission light being provided to utilization means in the downstream direction.

2. Article according to claim 1, further comprising a reflector disposed to receive light that propagates axially from the first length of SE-RE-doped optical fiber in the upstream direction, and to reflect at least some of said light back into the first length of SE-RE-doped optical fiber in the downstream direction, whereby generation of long wavelength amplified spontaneous emission light is further facilitated.

3. Article according to claim 2, wherein said reflector is a broadband reflector with reflectivity in the range 4–100%.

4. Article according to claim 1, wherein the source of the first pump light is also the source of the second pump light.

5. Article according to claim 1, wherein the source of the first pump light differs from the source of the second pump light.

6. Article according to claim 1, wherein the first and second lengths of optical fiber are doped with one or more numbers of the group consisting of Er, Yb and Nd.

7. Article according to claim 1, wherein the broadband spontaneous emission light that is provided to utilization means has a ±3 dB bandwidth greater than 40 nm and total power greater than 10 mW.

8. Article according to claim 7, wherein the article is an optical tomography system further comprising a first optical fiber path for providing broadband spontaneous emission light from the optical fiber light source to an object under examination, and still further comprising a second optical fiber path adapted for guiding light from a moveable reference mirror to a light detector, with a fiber coupler for coupling light between said first and second fiber paths.

* * * * *